United States Patent [19]

Mahoney et al.

[11] Patent Number: 5,888,434
[45] Date of Patent: Mar. 30, 1999

[54] PROCESS FOR MAKING A MICROPOROUS MEMBRANE FROM A BLEND CONTAINING A POLY (PHENYLENE SULFIDE) POLYMER, AN AMORPHOUS POLYMER, AND OPTIONALLY A SOLVENT

[75] Inventors: Robert D. Mahoney, Danville; Jiro Kawamoto, Walnut Creek; Richard A. Lundgard, Antioch; Mark F. Sonnenschein, Antioch; Hawk S. Wan, Antioch; H. Nelson Beck, Walnut Creek, all of Calif.

[73] Assignee: The Dow Chemical Company, Midland, Mich.

[21] Appl. No.: 12,872

[22] Filed: Feb. 3, 1993

Related U.S. Application Data

[63] Continuation-in-part of Ser. No. 746,756, Aug. 19, 1991, Pat. No. 5,246,647, which is a continuation-in-part of Ser. No. 329,666, Mar. 28, 1989, Pat. No. 5,043,112.

[51] Int. Cl.⁶ .............................. B29C 67/20; D01D 5/247
[52] U.S. Cl. .............................. 264/28; 264/41; 264/184; 264/203; 264/205; 264/210.3; 264/210.4; 264/210.6; 264/211; 264/211.12; 264/211.14; 264/211.15; 264/211.16; 264/211.18; 264/211.19; 264/211.2; 264/216; 264/235; 264/235.6; 264/288.8; 264/289.6; 264/290.5; 264/346

[58] Field of Search .................................. 264/28, 41, 49, 264/184, 203, 205, 210.3, 210.4, 210.6, 211, 211.12, 211.14, 211.15, 211.16, 211.18, 211.19, 211.2, 216, 235, 235.6, 288.8, 289.6, 290.5, 346

[56] References Cited

U.S. PATENT DOCUMENTS

| | | | |
|---|---|---|---|
| 5,043,112 | 8/1991 | Beck | 264/41 |
| 5,205,968 | 4/1993 | Damrow et al. | 264/28 |

*Primary Examiner*—Leo B. Tentoni

[57] ABSTRACT

The invention relates to a process for preparing a microporous membrane from an unsulfonated poly (phenylene sulfide) polymer by forming a mixture of an unsulfonated poly(phenylene sulfide) polymer, an amorphous polymer, and optionally a plasticizer, heating the resulting mixture, extruding or optionally casting the mixture into a membrane, controlled cooling (quenching) or coagulating the membrane, and leaching the membrane, while optionally drawing the membrane before, during, and/or after leaching.

38 Claims, 1 Drawing Sheet

PROCESS FOR MAKING A MICROPOROUS MEMBRANE FROM A BLEND CONTAINING A POLY (PHENYLENE SULFIDE) POLYMER, AN AMORPHOUS POLYMER, AND OPTIONALLY A SOLVENT

CROSS REFERENCE TO CO-PENDING PATENT APPLICATIONS

This application is a continuation-in-part of U.S. patent application Ser. No. 746,756, filed Aug. 19, 1991, now U.S. Pat. No. 5,246,647, issued Sep. 21, 1993, which in turn is a continuation-in-part of U.S. patent application Ser. No. 329,666, filed Mar. 28, 1989, now U.S. Pat. No. 5,043,112, both of which are incorporated herein by reference in their entirety.

BACKGROUND OF THE INVENTION

1. Field of Invention

The present invention relates to a process for preparing microporous membranes from a blend containing an unsulfonated poly(phenylene sulfide) (PPS) polymer, an amorphous polymer, and optionally a solvent and/or optional non-solvent. Such membranes are useful in the treatment of liquids by the membrane separation processes of ultrafiltration, microfiltration, depth filtration, macrofiltration, membrane distillation, and membrane stripping. The membranes of this invention are also useful as microporous supports for composite liquid and/or gas separation membranes.

2. Description of Related Art

In the past, microporous membranes have been fabricated from polyolefins such as polyethylene and polypropylene. One typical method of preparing such polyolefin membranes is by an extrusion process which involves dissolving the polyolefin in a solvent or a mixture of solvent and non-solvent, extruding the polyolefin/solvent/non-solvent mixture into membranes, and immersing the membranes into a leach bath. Another method of preparing such polyolefin membranes is by a melt-extrusion process which involves extruding the membranes from the molten polyolefin, followed by cold drawing the membranes. However, polyolefins, while inexpensive and easy to process, exhibit relatively low heat distortion temperatures.

Poly(phenylene sulfide) polymers are high performance thermoplastics which possess high glass transition temperatures, high crystalline melting points, high thermal stability, and high solvent resistance. Such properties make poly(phenylene sulfide) polymers useful for membranes employed in liquid separations, particularly membrane separation processes which involve treatment of organic, acidic, or basic liquids at elevated temperatures.

The very properties which make poly(phenylene sulfide) polymers desirable materials for use in applications which require high temperature and/or solvent resistance also render such polymers very difficult to process into membranes, particularly since poly(phenylene sulfide) polymers exhibit relatively low solution viscosities at the high membrane fabrication temperatures, in excess of about 250° C., frequently required to fabricate membranes. The low solution viscosities exhibited by poly(phenylene sulfide) polymers are particularly problematic with extrusion or casting blends containing less than about the 40 weight percent polymer required to produce high flux microporous membranes. Such low solution viscosities also render extrusion of hollow fiber microporous membranes from poly(phenylene sulfide) polymers especially difficult.

Furthermore, poly(phenylene sulfide) polymers are extremely solvent resistant and are therefore considered to be insoluble in all common solvents. Therefore, to form membranes, PPS, for example, is expected to be dissolved in very strong acids such as concentrated sulfuric acid to sulfonate the poly(phenylene sulfide), which renders the sulfonated poly(phenylene sulfide) soluble in common solvents such as dimethylformamide and dimethylacetamide. The problem associated with such a process is that the fabricated membrane comprises not poly(phenylene sulfide), but rather sulfonated poly(phenylene sulfide), which is soluble in common solvents. Thus the high solvent resistance of poly(phenylene sulfide) is lost.

What is needed is a process of preparing microporous membranes from unsulfonated poly(phenylene sulfide) polymers using plasticizers, that is, solvents and optional non-solvents, which do not chemically modify or degrade the unsulfonated poly(phenylene sulfide) polymer during fabrication so that the high strength, temperature resistance, and solvent resistance of the unsulfonated poly(phenylene sulfide) polymer is retained by the fabricated membranes.

What is further needed is a method of increasing the solution viscosities of the poly(phenylene sulfide) polymers, so that membranes can be more easily fabricated at the high temperatures required to fabricate membranes from such polymers, while retaining the high temperature and solvent resistance of the unsulfonated poly(phenylene sulfide) polymer.

What is especially needed is a process for preparing microporous membranes having high flux from unsulfonated poly(phenylene sulfide) polymers.

The membranes of the present invention accomplish these objectives and exhibit excellent solvent and temperature resistance. The membranes also possess high tensile strength. The membranes are useful as microporous membranes for liquid separations such as ultrafiltration, microfiltration, depth filtration, macrofiltration, membrane stripping, and membrane distillation and as microporous supports for composite liquid or gas separation membranes.

SUMMARY OF THE INVENTION

In one aspect the present invention relates to a process for preparing a microporous membrane from a poly(phenylene sulfide) polymer comprising the steps of:

A. forming a mixture comprising:
  (i) at least one poly(phenylene sulfide) polymer,
  (ii) at least one amorphous polymer which is substantially stable at elevated temperatures, which possesses a glass transition temperature of at least about −100° C., and wherein said amorphous polymer is at least partially immiscible in said poly(phenylene sulfide) polymer at ambient conditions; and
  (iii) optionally a plasticizer comprising at least one organic compound capable of dissolving at least about 10 weight percent of said poly(phenylene sulfide) polymer at the extrusion or casting temperature;

B. heating the mixture to a temperature at which said mixture becomes a fluid;

C. extruding or casting said fluid under conditions such that a membrane is formed;

D. subjecting said membrane to controlled cooling or coagulation by passing said membrane through at least one zone under conditions such that said membrane solidifies;

E. leaching said membrane by passing said membrane through at least one zone under conditions such that at least a portion of said optional plasticizer for said poly (phenylene sulfide) polymer, at least a portion of said amorphous polymer, or a combination thereof, is removed from said membrane; and F. producing a final microporous membrane.

In another embodiment, the present invention comprises the additional step of:

G. before leaching, during leaching, after leaching, or a combination thereof, drawing said membrane to increase the flux of fluid through said membrane, while said membrane is at a temperature above about 25° C. and below the melting point of said poly(phenylene sulfide) polymer and amorphous polymer or the poly(phenylene sulfide), amorphous polymer and plasticizer mixture before and during leaching and for poly(phenylene sulfide) after leaching.

In yet another embodiment the present invention further comprises the additional step of:

H. before leaching, after leaching, before drawing, after drawing, or a combination thereof, annealing said membrane by exposing said membrane to a temperature above the glass transition temperature of the poly(phenylene sulfide) polymer, the poly(phenylene sulfide) and amorphous polymer mixture, or the poly(phenylene sulfide) amorphous polymer and plasticizer mixture and about 10° C. below the melting point of the poly(phenylene sulfide) polymer or the depressed melting point of the poly (phenylene sulfide) and amorphous polymer mixture, or the poly(phenylene sulfide) polymer, amorphous polymer and plasticizer mixture for a period of time between about 30 seconds and about 24 hours.

The present invention also relates to the microporous membrane wherein said poly(phenylene sulfide) polymer has a degree of crystallinity of at least about 10 percent and a melting point of at least about 190° C.

In another aspect, the present invention relates to the process of the undrawn membrane and further comprises the additional step of:

I. before leaching, after leaching, or a combination thereof, annealing said membrane by exposing said membrane to a temperature above the glass transition temperature of the poly(phenylene sulfide) polymer or the poly (phenylene sulfide) polymer and plasticizer mixture and about 10° C. below the melting point of the poly (phenylene sulfide) polymer or the depressed melting point of the poly(phenylene sulfide) polymer and plasticizer mixture for a period of time between about 30 seconds and about 24 hours.

In another aspect, the invention relates to the undrawn membrane wherein the poly(phenylene sulfide) polymer has a degree of crystallinity of at least about 10 percent and a melting point of at least about 190° C.

DETAILED DESCRIPTION OF THE INVENTION AND PREFERRED EMBODIMENTS

Figure 1:
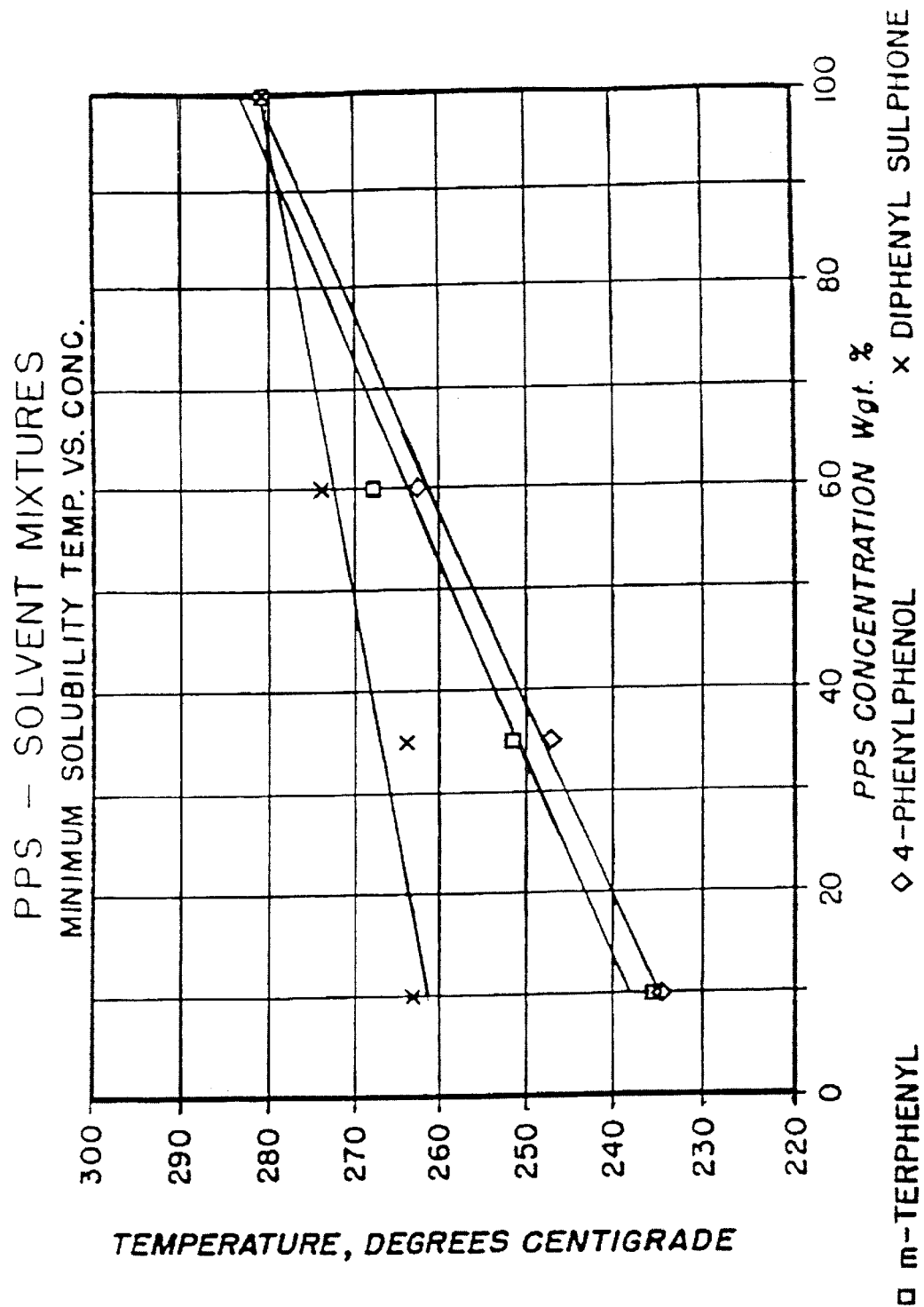
FIG. 1 illustrates a composite of temperature at ambient pressure at which a specific weight percent of PPS will dissolve in the solvents: m-terphenyl, 4-phenylphenol, and diphenylsulfone.

Definitions:

As used herein:

"Amorphous polymer" refers to amorphous polymers in general, and preferably to polymers independently selected from the group consisting of polysulfones; polyarylsulfones; polyethersulfones; styrene copolymers; polyetherimides, polyetherimide copolymers; ethylene copolymers; amorphous polyesters; amorphous cellulose esters; polycarbonates; polystyrenes; polysiloxanes; polyacrylates; polymethacrylates; poly(vinylacetates); polybenzimidazoles; and polyacrylamides.

"Plasticizer" refers generally to at least one solvent consisting predominantly of carbon and hydrogen and optionally oxygen, nitrogen, sulfur, halogen, and mixtures thereof, wherein said solvent has a molecular weight of between about 160 and about 650, contains at least one 5,6 or 7-membered ring structure, and possesses a boiling point of between about 150° C. and about 480° C.

"Plasticizer" also preferably refers to at least one solvent independently selected from the group consisting of 4,4'-dibromobiphenyl; 1-phenylnaphthalene; phenothiazine; 2,5-biphenyl-1,3,4-oxadiazole; 2,5-diphenyloxazole; triphenylmethanol; N,N-diphenylformamide; m-terphenyl; benzil; anthracene; 4-benzoylbiphenyl; dibenzoylmethane; 2-biphenylcarboxylic acid; dibenzothiophene; pentachlorophenol; benzophenone; 1-benzyl-2-pyrrolidinone; 9-fluorenone; 2-benzoylnaphthalene; 1-bromonphthalene; diphenyl sulfide; 1,3-diphenoxybenzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3,-triphenylbenzene; triphenylene; 4-bromobiphenyl; 2-phenylphenol; thianthrene; 4,4'-diphenylbenzophenone; 3-phenoxybenzyl alcohol; 4-phenylphenol; 9,10-dichloroanthracene; p-terphenyl; 2-phenoxybiphenyl; triphenylmethane; 4,4'-dimethoxybenzophenone; 9,10-diphenylanthracene; fluoranthene; diphenyl sulfone; diphenyl phthalate; diphenyl terephthalate; diphenyl isophthalate; diphenyl carbonate; 2,6-dimethoxynaphthalene; 2,7-dimethoxynaphthalene; 4-bromodiphenyl ether; pyrene; 9,9'-bifluorene; 4,4'-isopropylidenediphenol; 2,4,6-trichlorophenol; epsilon-caprolactam; 1-cyclohexyl-2-pyrrolidinone; and mixtures of these compounds.

"Plasticizer" may optionally also further include at least one non-solvent consisting predominantly of carbon and hydrogen and optionally oxygen, phosphorus, silicon, nitrogen, sulfur, halogen, and mixtures thereof, wherein said non-solvent has a molecular weight of between about 120 and about 650 and possesses a boiling point of between about 150° C. and about 480° C.

"Plasticizer" preferably optionally further comprises at least one non-solvent selected from the group consisting of 1,3,5-triphenylbenzene, tetraphenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphosphoric acid, dioctyl phthalate, 5-chlorobenzoxazolone, bis-(4-chlorophenol sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, and 4,4'-dihydroxybenzophenone.

"Poly(phenylene sulfide)" or "PPS" refers to a polymeric material which comprises poly(phenylene sulfide). Usually this polymer is prepared from p-dichlorobenzene and sodium sulfide or obtained from Phillips Petroleum Co. Bartlesville, Okla. or Aldrich Chemical Company (or as is described below).

The PPS designated lot #172CJ from Aldrich Chemical Company was used as received for solubility determinations. Most of the organic compounds examined as high temperature solvents are obtained from Aldrich Chemical Company and are used as received. Other organic chemicals are obtained from suppliers as listed in *Chemical Sources U.S.A.*, Boca Ratan, Fla.

The poly(phenylene sulfide) polymers useful in this invention are unsulfonated. The PPS polymers from which the membranes are fabricated preferably possess a degree of crystallinity of at least about 10 percent, more preferably of at least about 20 percent, even more preferably of at least about 30 percent, and a melting point of at least about 190° C., more preferably of at least about 250° C.

Commercially available PPS, for example, FORTRON® Grade 300 BO (® trademark of Hoescht Celanese, Inc.), possesses a glass transition temperature of about 90° C. and a melting point of about 285°–300° C. Such commercially available PPS possesses a tensile strength of about 12,500 psi (ASTM Test Method D638), and an elongation of 3–6% at about 23° C. (and test speed of about 0.2 in./min., a flexural strength of about 21,000 psi (ASTM Test Method D-790 at 5% deflection), and a flexural modulus of about $0.6 \times 10^6$ psi (ASTM Method D-790). The synthesis of such PPS polymers is known in the art. See U.S. Pat. Nos. 3,354,129 and 3,524,835, the relevant portions are incorporated herein by reference.

Amorphous Polymers

The amorphous polymers useful in this invention are at least partially immiscible at ambient (room) temperature with the poly(phenylene sulfide) polymer in the presence or absence of a plasticizer. In the art generally, some binary and ternary systems containing two polymers and a plasticizer comprising a solvent and optional non-solvent may form a single phase or two coexisting phases, depending upon the relative proportions of the components in the system. The term compatibility is often used in the art in a thermodynamic sense to be synonymous with miscibility. Solution methods are commonly used to determine the miscibility of mixtures of two polymers in a solvent and optional non-solvent. One method of determining miscibility is to mix two polymers and a solvent and optional non-solvent. On standing for a few days, the polymers are considered miscible if phase separation does not occur; if phase separation does occur, the two polymers are said to be immiscible. In the present invention, the relative concentrations of the poly(phenylene sulfide) polymer, the amorphous polymer, and optional plasticizer comprising solvent and optional non-solvent in the mixture must be such that the resulting binary or ternary mixture is immiscible, that is, physically a multiphase system at ambient (room) temperature up to about 50° C. below the membrane fabrication temperature. See C. Olabisi, "Polyblends," *Encyl. of Chem. Tech.*, 3rd Ed., Interscience, New York, N.Y., Vol. 18, P. 443 (1982); H. Tompa, "Polymer Solutions," Academic Press, New York, N.Y., pp. 200–201 (1959); J. Hildebrand et al., "The Solubility of Non-Electrolytes," 3rd Ed., Rheinhold Publishing, New York, N.Y., pp. 382–383 (1950); D. R. Paul, "Interfacial Agents (Compatibilizers) For Polymer Blends," *Polymer Blends*, Vol. 2, Academic Press, New York, N.Y., pp. 35–36 (1978); P. J. Flory, "Principals of Polymer Chemistry," Cornell University Press, Ithaca, N.Y., pp. 554–559 (1953); H. Morawetz, "Macromolecules in Solution," Interscience Publishing, New York, N.Y., pp. 85–88 (1965); the relevant portions are incorporated herein by reference.

The amorphous polymers useful in this invention are stable at the elevated temperatures required for fabricating the membrane. The amorphous polymers are stable at temperatures preferably above about 150° C., more preferably above about 200° C., even more preferably above about 250° C. Stable at elevated temperatures means that the amorphous polymers do no undergo substantial degradation at the membrane fabrication temperature. The amorphous polymers useful in this invention preferably possess a glass transition temperature of at least about –100° C., more preferably of at least about –80° C., even more preferably of at least about –60° C. The amorphous polymers useful in this invention possess a molecular weight preferably of at least about 500, more preferably of at least about 1,000. The amorphous polymers useful in this invention possess a molecular weight preferably of less than about $4 \times 10^6$, more preferably of less than about $3 \times 10^6$, even more preferably of less than about $1 \times 10^6$.

Preferred amorphous polymers for use in this invention include polysulfones; polyethersulfones; styrene copolymers, such as styrene-acrylonitrile copolymer and styrene-maleic anhydride copolymer; amorphous cellulose esters such as cellulose acetate butyrate and cellulose acetate propionate; amorphous ethylene copolymers; amorphous polyesters; amorphous cellulose ethers such as ETHOCEL® ethyl cellulose resin and METHOCEL® methyl cellulose resin (® trademarks of The Dow Chemical Company); polycarbonates; polystyrenes; polysiloxanes; polyacrylates; polymethacrylates; poly(vinylacetates); and polyacrylamides. More preferred amorphous polymers include polysulfones, polyethersulfones, amorphous polyesters, and polycarbonates.

Plasticizers

The plasticizers useful in this invention comprise at least one organic compound preferably capable of dissolving at least about 10 weight percent of the poly(phenylene sulfide) polymer present at the membrane fabrication temperature. The plasticizer more preferably dissolves at the fabrication temperature at least about 25 weight percent of the poly (phenylene sulfide) polymer and even more preferably about 50 weight percent of the poly(phenylene sulfide) polymer. The plasticizer may be comprised of a solvent for the poly(phenylene sulfide) polymer or a mixture of a solvent and non-solvent for the poly(phenylene sulfide) polymer, provided the solvent and non-solvent mixture itself is capable of dissolving at least about 10 weight percent of the poly(phenylene sulfide) polymer at the membrane fabrication temperature. A solvent for the poly(phenylene sulfide) polymer dissolves at least about 10 weight percent poly (phenylene sulfide) polymer at the membrane fabrication temperature. A non-solvent for the poly(phenylene sulfide) polymer dissolves less than about 10 weight percent of the poly(phenylene sulfide) polymers at the membrane fabrication temperature.

A preferred class of plasticizers (solvents) useful in this invention are organic compounds consisting predominantly of carbon and hydrogen and optionally oxygen, nitrogen, sulfur, halogen, and mixtures thereof, wherein the organic compound has a molecular weight of between about 160 and about 650, contains at least one 5, 6 or 7 membered ring structure, and possesses a boiling point of between about 150° C. and about 480° C. In one aspect, aromatic 6-membered rings are preferred. Preferable solvents are described above.

Non-solvents

A preferred class of non-solvents useful in this invention are organic compounds consisting predominantly of carbon and hydrogen and optionally oxygen, phosphorus, silicon, nitrogen, sulfur, halogen, and mixtures thereof, wherein the organic compound has a molecular weight of between about 120 and 650, and possesses a boiling point of between about 150° C. and about 480° C. The non-solvents more preferably have a boiling point of between about 280° C. and about 480° C., even more preferably between 300° C. and about 480° C. The non-solvents preferably are soluble in the solvent used at elevated temperatures. Preferred non-solvents are described above.

The concentrations of the components in the mixture may vary and are dependent upon the desired membrane characteristics, such as porosity and pore size, and the fabrication method. The concentrations of PPS polymer, the amorphous polymer, and the plasticizer in the mixture is that which result in a mixture with a suitable viscosity for extrusion or casting at the membrane fabrication temperature. The viscosity of the mixture must not be so high that the fluid is too viscous to fabricate; the viscosity must not be so low that the fluid lacks the physical integrity required to form a membrane. Extrusion mixtures of PPS polymers, amorphous polymers, and plasticizers generally possess non-Newtonian viscosity behavior; therefore, such mixtures exhibit a shear rate dependence upon viscosity. The mixture preferably has a viscosity at extrusion temperatures of between about 100 and about 10,000 poise at a shear rate of from about 10 to about 10,000 $sec^{-1}$.

The concentration of PPS polymer in the mixture is preferably from about 10 weight percent to about 90 weight percent, more preferably from about 20 weight percent to about 80 weight percent, even more preferably from about 25 weight percent to about 75 weight percent.

The concentration of amorphous polymer in the mixture is preferably from about 3 weight percent to about 80 weight percent, more preferably from about 3 weight percent to about 70 weight percent, even more preferably from about 3 weight percent to about 65 weight percent.

Fabrication

The membranes of this invention may be prepared by casting or extrusion. In the casting process, the polymers are contacted with the plasticizer comprising at least one solvent and optionally at least one non-solvent for the poly (phenylene sulfide) polymer at elevated temperatures. The elevated temperature at which the mixture is contacted is that temperature at which the mixture is a fluid, and below that temperature at which the polymers undergo substantial degradation and below that temperature at which the plasticizer comprising solvent and optional non-solvent boils. The upper temperature limit is preferably below about 400° C., more preferably below about 380° C., even more preferably below about 370° C. The minimum temperature limit is preferably at least about 25° C. The contacting preferably takes place with adequate mixing or agitation.

In the case of casting, a membrane may be cast into flat sheet form by pouring the mixture onto a smooth support surface and drawing down the mixture to an appropriate thickness with a suitable tool such as a doctor blade or casting bar. Alternately, the mixture may be cast in a continuous process by casting the mixture onto endless belts or rotating drums. The casting surface may be such that the membrane may thereafter be readily separated from the surface. For example, the membrane may be cast onto a support having a low surface energy, such as silicone, coated glass, TEFLON®, or coated metal, or a surface to which the membrane will not adhere. Alternately, the mixture may be cast onto a support surface which may thereafter be dissolved away from the finished membrane. The mixture may also be cast onto a porous support surface. The cast membrane is thereafter subsequently quenched or coagulated, leached, and optionally drawn as described hereinafter for membranes formed by the extrusion process.

Membranes may be extruded from the poly(phenylene sulfide) polymer mixtures hereinbefore described. The components of the extrusion mixture may be combined prior to extrusion by mixing in any convenient manner with conventional mixing equipment, as for example, in a Hobart brand mixer. The extrusion blend may also be combined and mixed under heating in a resin kettle. Alternately, the extrusion mixture may be combined by extruding the mixture through a twin screw extruder, cooling the extrudate, and grinding or pelletizing the extrudate to a particle size readily fed to a single or twin screw extruder. Alternately, the components of the extrusion composition may be combined directly in a melt-pot or twin screw extruder and extruded into membranes in a single step. The use of static mixers helps to ensure adequate mixing of the components.

The mixture is heated to a temperature which results in a fluid possessing a viscosity suitable for extrusion. The temperature should not be so high or the exposure time so long as to cause significant degradation of the poly (phenylene sulfide) polymer, the amorphous polymer, and/or the plasticizer. The temperature should not be so low as to render the fluid too viscous to extrude. The extrusion temperature is preferably between about 100° C. and about 400° C., more preferably between about 110° C. and about 380° C., even more preferably between about 120° C. and about 370° C.

The mixture of polymers and plasticizer is extruded through a film, tube, or hollow fiber die (spinnerette). Hollow fiber spinnerettes typically are multi-holed and thus produce a tow of multiple fibers. The hollow fiber spinnerettes include a means for supplying fluid to the core of the extrudate. The core fluid is used to prevent the collapsing of the hollow fibers as they exit the spinnerette. The core fluid may be a gas such as nitrogen, air, carbon dioxide, or other inert gas or a liquid which is a non-solvent for the polymers. Examples of suitable core liquids include dioctylphthalate, methyl stearate, polyglycol, mineral oil, paraffin oil, petroleum oil, for example, MOBILTHERM® 600, 603, and 605 heat transfer oils (®trademarks of Mobil Oil Corporation), and silicone oil, for example, DC-704® and DC-710® silicone oil (®trademarks of Dow-Corning Corporation). Use of a liquid non-solvent as the core fluid may result in a microporous membrane with an inside skin. A solvent and non-solvent core liquid mixture may be used to control the inside skin morphology. A non-solvent fluid may optionally be used on the outside of the hollow fiber membrane to produce an outside skin.

The extrudate exiting the die enters one or more controlled cooling (quench) or coagulation zones. The environment of the quench or coagulation zone may be a gas or a liquid. Within the quench or coagulation zone, the extrudate is subjected to cooling and/or coagulation to cause solidification of the membrane with the optional simultaneous removal of a portion of the plasticizer.

In a preferred embodiment, the membrane is initially quenched in a gaseous environment such as air, nitrogen, or other inert gas. In a preferred embodiment, the membrane is slowly quenched or cooled, so as to permit sufficient time for phase separation to occur. With slow quenching or cooling, relatively low concentrations of amorphous polymer, that is, less than about 15 weight percent, may be used while still obtaining a membrane with a high flux. The temperature of the gaseous quench zone is that temperature at which solidification occurs at a reasonable rate. The temperature of the gaseous quench zone is preferably in the range of from about 0° C. to about 275° C., more preferably in the range of from about 5° C. to about 270° C., even more preferably in the range of from about 25° C. to about 200° C. The residence time in the gaseous quench zone is that which is sufficient to solidify the membrane. The residence time in the gaseous quench zone is preferably at least about 0.01 seconds, more preferably at least about 0.5 seconds, even more preferably at least about 2 seconds. The residence time in the gaseous quench zone is preferably less than about 300 seconds, more preferably less than about 120 seconds, even more preferably less than about 90 seconds. Shrouds may be used to help control gaseous flow rates and temperatures within the gaseous quench zone.

Following or instead of the gaseous quench, the membrane may optionally be quenched or coagulated in a liquid environment which is substantially a non-solvent for the poly(phenylene sulfide) polymer, such as water, ethylene glycol, or glycerol, and which optionally contains an effective amount of a swelling agent. The temperature of the quench liquid is that temperature at which the membrane is not adversely affected and at which solidification occurs at a reasonable rate. The liquid quench temperature is preferably between about 0° C. and about 275° C., more preferably between about 5° C. and about 250° C., even more preferably between about 10° C. and about 225° C. The residence time in the liquid quench zone is that which is sufficient to solidify the membrane. The residence time in the liquid quench zone is preferably at least about 0.01 seconds, more preferably at least about 0.5 seconds, and even more preferably at least about 2 sec. The residence time in the liquid quench zone is preferably less than about 300 seconds, more preferably less than about 120 seconds, and even more preferably less than about 90 seconds.

Following quenching and/or coagulation, the membrane may be passed through one or more leach zones to remove at least a portion of the plasticizer, at least a portion of the amorphous polymer, or a combination thereof. The leach zone need not remove all of the plasticizer and/or amorphous polymer from the membrane. The leach zone preferably removes a substantial portion of the plasticizer and amorphous polymer from the membrane. Preferably, the leach zone removes the plasticizer to a level of less than about 5.0 weight percent in the leached membrane, more preferably of less than about 2.0 weight percent in the leached membrane, even more preferably of less than about 0.5 weight percent in the leached membrane. Preferably, the leach zone removes the amorphous polymer to a level of less than about 5.0 weight percent in the leached membrane, more preferably of less than about 2.0 weight percent in the leached membrane, even more preferably of less than about 0.5 weight percent in the leached membrane.

The leach zone is comprised of a liquid which is a non-solvent for the poly(phenylene sulfide) polymer and which is a solvent for the plasticizer and/or amorphous polymer. Preferred leach liquids include toluene, xylene, acetone, methyl ethyl ketone, N-methyl-pyrrolidinone, water, and chlorinated hydrocarbons such as methylene chloride, carbon tetrachloride, trichloroethylene, and 1,1,1-trichloroethane. The leach liquid may also comprise an acid or alkali aqueous solution if an acid or alkali soluble solvent and optional non-solvent for the poly(phenylene sulfide) polymer are used in the extrusion or casting mixture.

The maximum temperature of the leach bath is that temperature at which the membrane is not adversely affected. The minimum temperature of the leach bath is that temperature at which plasticizer and/or amorphous polymer removal from the membrane occurs at a reasonable rate. The temperature of the leach bath is preferably between about 0° C. and about 250° C., more preferably between about 5° C. and about 200° C., even more preferably between about 10° C. and about 150° C. The residence time in the leach bath is preferably long enough to remove at least a portion of the plasticizer and/or amorphous polymer. The residence time in the leach bath is preferably less than about 14 hours, more preferably less than about 2 hours. The residence time in the leach bath is preferably more than about 1 second, even more preferably more than about 30 seconds.

The organic compounds described herein as solvents (or plasticizers) or non solvents may need to be used in large quantities when commercial membranes are fabricated. Thus it is expected that environmentally acceptable compounds (e.g. those not containing any halogen-atoms) will be preferred. Similarly, the preferred leaching or quenching organic compounds used for commercial scale will also be environmentally acceptable.

Following leaching, the membrane may optionally be dried. Prior to drying, the leach liquid remaining in the membrane may optionally be exchanged with a more volatile, non-polar drying agent which possesses a low surface tension and is a solvent for the leach liquid and which is a non-solvent for the poly(phenylene sulfide) polymer in order to reduce the possibility of pore collapse during drying. Preferred drying agents include chlorofluorocarbons, for example, FREON 113® chlorofluorocarbon (®trademark of E. I. dupont de Nemours), isopropanol, or isooctane. The exchange may be carried out at temperatures which do not adversely affect the membrane, preferably between about 0° C. and about 100° C. The membrane may be dried in air or an inert gas such as nitrogen. Drying may also be done under vacuum. The membrane may be dried at temperatures at which drying takes place at a reasonable rate and which do not adversely affect the membrane. The drying temperature is preferably between about 0° C. and about 180° C., more preferably between about 10° C. and 150° C., even more preferably between about 15° C. and about 120° C. The drying time is preferably less than about 24 hours, more preferably less than about 6 hours. The drying time is preferably at least about 30 seconds, more preferably at least about 60 seconds.

The membrane may optionally be drawn or stretched subsequent to the quenching or coagulation step using conventional equipment such as godets to improve the flux and strength of the membrane. Drawing may occur before leaching, during leaching, after leaching, before drying, during drying, after drying, or a combination thereof. The draw temperature is dependent upon whether the membrane contains plasticizer at the time of drawing. For substantially plasticizer-free membranes, the membrane is drawn at a temperature which is above the glass transition temperature and below the crystalline melting point of the poly(phenylene sulfide) polymer; the minimum temperature at which the PPS membrane is drawn is preferably at least about 90° C., more preferably at least about 100° C. The maximum temperature at which the membrane is drawn is preferably less than about 270° C., more preferably less than about 260° C. For membranes containing plasticizer, the membrane is drawn at a temperature between ambient temperature and the melting point of the poly(phenylene sulfide) polymer or the depressed melting point of the poly(phenylene sulfide) polymer and plasticizer mixture; preferred lower draw temperatures are above about 25° C.; preferred upper draw temperatures are less than about 10° C.

below the depressed melting point. The membranes are drawn by stretching the membranes under tension. The membranes are drawn to a ratio of between about 1.1 and about 40, more preferably of between about 1.5 and about 30. The draw ratio refers to the ratio of the original length of the membrane before drawing to the final length of the membrane after drawing. The degree of draw may also be expressed as percent elongation, which is calculated by $$\frac{(L_f - L_i)}{L_i} \times 100,$$

wherein $L_f$ is the final length of the membrane after drawing and $L_i$ is the initial length of the membrane before drawing. Drawing may be carried out in a single step or in a series of steps using the same or different draw ratios in each step.

Line speeds for drawing are not critical and may vary significantly. Practical preferred line speeds range from about 10 feet per minute (3 meters per minute) to about 2,000 feet per minute (610 meters per minute). In the case of hollow fibers, the fibers preferably possess an outside diameter of from about 10 to about 7,000 microns, more preferably of from about 50 to about 5,000 microns, even more preferably of from about 100 to about 4,000 microns with a wall thickness preferably of from about 10 to about 700 microns, more preferably of from about 25 to about 500 microns. In the case of films, the films preferably possess a thickness of from about 10 to about 800 microns, more preferably of from about 25 to about 600 microns. The films may optionally be supported by a permeable cloth or screen.

Optionally, before leaching, after leaching, before drawing, after drawing, or a combination thereof, the membrane may be annealed by exposing the membrane to elevated temperatures. The membrane may be annealed at temperatures above the glass transition temperature (Tg) of the polymer or polymer and plasticizer mixture and about 10° C. below the melting point of the PPS polymer or depressed melting point of the PPS polymer and plasticizer mixture for a period of time between about 30 seconds and about 24 hours.

The membranes of this invention may be isotropic or anisotropic. Isotropic microporous membranes possess a morphology in which the pore size within the membrane is substantially uniform throughout the membrane. Anisotropic (asymmetric) microporous membranes possess a morphology in which a pore size gradient exists across the membrane; that is, the membrane morphology varies from highly porous, larger pores at one membrane surface to less porous, smaller pores at the other membrane surface. Such anisotropic membranes thus possess a microporous "skin" of smaller pores. In hollow fiber anisotropic membranes, the "skin" may be on the inside or outside surface of the hollow fiber. The term "asymmetric" is often used interchangeably with the term "anisotropic."

In a preferred embodiment of this invention, the microporous membranes are useful in the treatment of liquids by the membrane separation processes of microfiltration, ultrafiltration, macrofiltration, depth filtration, membrane stripping, and membrane distillation. Such membranes may also be used as porous supports for composite gas or liquid separation membranes. In a preferred embodiment, the microporous membranes are useful for ultrafiltration or microfiltration. Ultrafiltration and microfiltration are pressure driven filtration processes using microporous membranes in which particles or solutes are separated from solutions. Separation is achieved on the basis of differences in particle size or molecular weight. Macrofiltration is a pressure driven filtration process using microporous membranes to separate particles or solutes having a size greater than about 10 microns from solution.

Ultrafiltration and microfiltration membranes may be characterized in a variety of ways, including porosity, mean pore size, maximum pore size, bubble point, gas flux, water flux, Scanning Electron Microscopy (SEM), and molecular weight cut off. Such techniques are well known in the art for characterizing microporous membranes. See Robert Kesting, *Synthetic Polymer Membranes*, 2nd edition, John Wiley & Sons, New York, N.Y., 1985, pp. 43–64; Channing R. Robertson (Stanford University), *Molecular and Macromolecular Sieving by Asymmetric Ultrafiltration Membranes*, OWRT Report, NTIS No. PB85-1577661EAR, September 1984; and ASTM Test Methods F316-86 and F317-72 (1982); the relevant portions of which are incorporated herein by reference.

Porosity refers to the volumetric void volume of the membrane. The membranes must possess porosities permitting sufficient flux through the membrane while retaining sufficient mechanical strength under use conditions. The membranes of this invention preferably have a porosity of at least about 10 percent, more preferably of at least about 20 percent, even more preferably of at least about 25 percent. The membranes of this invention preferably have a porosity of less than about 90 percent, more preferably of less than about 80 percent, even more preferably of less than about 75 percent.

Pore size of the membrane may be estimated by several techniques including Scanning Electron Microscopy (SEM), and/or measurements of bubble point, gas flux, water flux, and molecular weight cut off. The pore size of any given membrane is distributed over a range of pore sizes, which may be narrow or broad.

The bubble point pressure of a membrane is measured by mounting the membrane in a pressure cell with liquid in the pores of the membrane. The pressure of the cell is gradually increased until air bubbles permeate the membrane. Because larger pores become permeable at lower pressures, the first appearance of bubbles is indicative of the maximum pore size of the membrane. If the number of pores which are permeable to air increases substantially with a small increase in pressure, a narrow pore size distribution is indicated. If the number of air-permeable pores increases gradually with increasing pressure, a broad pore size distribution is indicated. The relationship between pore size and bubble point pressure can be calculated from the equation $$r = \frac{2G}{P}$$

wherein
  r is the pore radius,
  G is the surface tension of the liquid in the membrane pores, and
  P is the pressure.

The mean pore size of the membranes of this invention useful for ultrafiltration is preferably between about 5 Angstroms and about 1,000 Angstroms, more preferably between about 10 Angstroms and about 500 Angstroms. The maximum pore size of such membranes is preferably less than about 1,000 Angstroms, more preferably less than about 800 Angstroms. The mean pore size of the membranes of this invention useful for microfiltration is preferably between about 0.02 micron and about 10 microns, more preferably between about 0.05 micron and about 5 microns; the maximum pore size of such membranes is preferably less than about 10 microns, more preferably less than about 8 microns. The mean pore size of membranes of this invention useful for macrofiltration is preferably between about 10 microns and about 50 microns.

Gas flux is defined as:

$$F = \frac{\text{(amount of gas passing through the membrane)}}{\text{(membrane area)(time)(driving force across the membrane)}}.$$

A standard gas flux unit is $$\frac{(\text{centimeter})^3 \text{ (STP)}}{(\text{centimeter})^2(\text{second})(\text{centimeter Hg})},$$

abbreviated hereinafter as $$\frac{\text{cm}^3 \text{ (STP)}}{\text{cm}^2 \text{ sec cmhg}},$$

where STP stands for standard temperature and pressure.

The membranes of this invention preferably have a gas flux for nitrogen of at least about $$10^{-6} \frac{\text{cm}^3 \text{ (STP)}}{\text{cm}^2 \text{ sec cmHg}},$$

more preferably of at least about $$10^{-5} \frac{\text{cm}^3 \text{ (STP)}}{\text{cm}^2 \text{ sec cmHg}},$$

even more preferably of at least about $$10^{-4} \frac{\text{cm}^3 \text{ (STP)}}{\text{cm}^2 \text{ sec cmHg}},$$

Water flux is defined as $$W = \frac{\text{(amount fo water passing through the membrane)}}{\text{(membrane area)(time)}},$$

under given conditions of temperature and pressure.

The membranes of this invention preferably exhibit a water flux of at least about $$1 \frac{\text{ml}}{\text{m}^2 \text{ hr cmHg}},$$

more preferably of at least about $$5 \frac{\text{ml}}{\text{m}^2 \text{ hr cmHg}},$$

even more preferably of at least about $$10 \frac{\text{ml}}{\text{m}^2 \text{ hr cmHg}},$$

The membranes are fabricated into flat sheet, spiral wound, tubular, or hollow fiber devices by methods described in the art. Spiral wound, tubular, and hollow fiber devices are preferred. Tubesheets may be affixed to the membranes by techniques known in the art. Preferred tubesheet materials include thermoset and thermoplastic polymers. The membrane is sealingly mounted in a pressure vessel in such a manner that the membrane separates the vessel into two fluid regions wherein fluid flow between the two regions is accomplished by fluid permeating through the membrane. Conventional membrane devices and fabrication procedures are well known in the art.

Ultrafiltration, microfiltration, and macrofiltration are pressure driven filtration processes using microporous membranes to recover or isolate solutes or particles from solutions. The membrane divides the separation chamber into two regions, a higher pressure side into which the feed solution is introduced and a lower pressure side. One side of the membrane is contacted with the feed solution under pressure, while a pressure differential is maintained across the membrane. To be useful, a least one of the particles or solutes of the solution is selectively retained on the high pressure side of the membrane while the remainder of the solution selectively passes through the membrane. Thus, the membrane selectively "rejects" at least one type of the particles or solutes in the solution, resulting in a retentate stream being withdrawn from the high pressure side of the membrane which is enriched or concentrated in the selectively rejected particle(s) or solute(s) and a filtrate stream being withdrawn from the low pressure side of the membrane which is depleted in the selectively rejected particle(s) or solute(s).

The separation process should be carried out at pressures which do not adversely affect the membrane, that is, pressures which do not cause the membrane to mechanically fail. The pressure differential across the membrane is dependent upon the membrane characteristics, including pore size and porosity. For the membranes of this invention useful for ultrafiltration or microfiltration, the pressure differential across the membrane is preferably between about 2 psig and about 500 psig, more preferably between about 2 psig and about 300 psig, even more preferably between about 2 psig and about 150 psig. Ultrafiltration is commonly performed between about 10 and 100 psig. Microfiltration in commonly performed at between about 2 and 50 psig. Macrofiltration is commonly performed at between about 0.5 and 5 psig. For the membranes of this invention useful as composite supports for gas or liquid separation membranes, the pressure differential across the membrane is preferably between about 5 psig and about 1,500 psig. The separation process should be carried out at temperatures which do not adversely affect membrane integrity. Under continuous operation, the operating temperature is preferably between about 0° C. and about 3000° C., more preferably between about 15° C. and about 250° C., even more preferably between about 20° C. and about 175° C.

In specific embodiments, the amount of poly(phenylene sulfide) polymer in the polymer-plasticizer mixture is between about 10 weight percent and about 90 weight percent.

In specific embodiments, the membrane is drawn in Step G at a temperature of between about 25° C. and about 273° C.

In specific embodiments, the membrane is drawn to a draw ratio of between about 1.1 and about 40.

In specific embodiments, the fluid polymer is extruded at a temperature of between about 100° C. and about 400° C.

In specific embodiments, the membrane is subjected to controlled cooling or coagulation at a temperature of between about 0° C. and about 275° C.

In specific embodiments, the controlled cooling zone comprises a gaseous environment.

In specific embodiments, the membrane is leached at a temperature of between about 0° C. and about 275° C.

In specific embodiments, the leach zone comprises a liquid selected from the group consisting of toluene, xylene, acetone, methyl ethyl ketone, N-methylpyrrolidinone, water, an acid or alkali aqueous solution, and chlorinated hydrocarbons.

In specific embodiments, the final membrane is useful for ultrafiltration, microfiltration, or macrofiltration, or as a composite membrane support.

In specific embodiments, the final membrane possesses a porosity in the range of about 10 percent to about 90 percent.

In specific embodiments, the mean pore size of the membrane is in the range of about 5 Angstroms to about 1,000 Angstroms for ultrafiltration, about 0.02 micron to about 10 microns for micro-filtration, and about 10 microns to about 50 microns for macrofiltration.

In specific embodiments, the said membrane possesses a nitrogen flux of at least about $$10^{-4} \frac{cm^3 \ (STP)}{cm^2 \ sec \ cmHg}.$$

In specific embodiments, the said membrane possesses a water flux of at least about $$10 \frac{ml}{m^2 \ hr \ cmHg}.$$

In specific embodiments of claims 2 to 20, and 21 to 40, only a binary system of PPS and one or more amorphous polymers is present.

In specific embodiments of claims 2 to 20, and 21 to 40, a ternary system of PPS, one or more amorphous polymers, one or more solvents (plasticizers) and optionally one or more non-solvents is present.

The following Examples are presented for illustrative purposes only and are not intended to limit the scope of the invention or claims.

EXAMPLE A—Solvents and Non-Solvents for Poly(phenylene sulfide) (PPS)

Poly(phenylene sulfide) (PPS), designated as catalogue no. 18,235-4, Lot #172CJ, was obtained commercially from Aldrich Chemical Co. The PPS was dried at about 150° C. for 16 hours in an air-circulating oven and was stored in a desiccator over DRIERITE® brand desicating material. Large commercial quantities of PPS were obtained as PPS Grade 300BO from Hoechst Celanese, Inc. One hundred seven organic compounds were evaluated for their solvent effect on PPS. Most of the organic compounds were obtained from Aldrich Chemical Company and used as received. Other organic chemicals were obtained from suppliers as listed in *Chemical Sources U.S.A.*, published annually by Directories Publishing Co., Inc., of Boca Ratan, Fla.

Mixtures of PPS and a solvent and/or a non-solvent, a total weight of less than about 2 grams, were prepared by weighing PPS and solvent at a precision of ±0.001 in a 1 to 4 dram size glass vial. The resulting air space in each vial, which varied considerably due to the large differences in the bulk densities of the compounds, was purged with nitrogen. The vials were sealed with screw caps containing aluminum foil liners. Solubility was usually determined at about 10 weight percent polymer, followed by additional determinations at about 25 and about 50 weight percent if necessary.

Table 1 below lists the organic compounds examined for their solvent effect with PPS. The approximate solubility of each the polymer is shown at the indicated temperature(s). The organic compounds were assigned a number (beginning with 200) for easy reference.

Also, listed in Table 1 is an approximate molecular weight, melting point, and boiling point, if these physical properties were available.

In the Tables, "g" in the solubility column means "greater than" (>), s means "smaller than" (<), and=means "equal to."

TABLE 1

RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 200 | Triphenylmethanol | 260 | 161 | 360 | g 50.1%? | 349 |
| 201 | Triphenylmethane | 244 | 93 | 359 | g 50.0% | 349 |
| 202 | Triphenylene | 228 | 196 | 438 | g 49.9% | 350 |
| 203 | 1,2,3-Triphenylbenzene | 306 | 158 | — | g 49.9% | 349 |
| 204 | 1,3,5-Triphenylbenzene | 306 | 173 | 460 | s 10.4% | 349 |
| 205 | Tetraphenylmethane | 320 | 281 | 431 | s 25.2% | 349 |
| 205 | Tetraphenylmethane | 320 | 281 | 431 | =s 50.3%? | 349 |
| 206 | Tetraphenylsilane | 337 | 236 | 422 | s 9.9% | 349 |
| 207 | Diphenyl sulfoxide | 202 | 70 | 350 | s 10.4%a | 349 |
| 208 | Diphenyl sulfone | 218 | 124 | 379 | g 50.0% | 349 |
| 209 | 2,5-Diphenyloxazole | 221 | 72 | 360 | g 50.1% | 349 |
| 210 | Diphenic acid | 242 | 228 | — | s 10.1%a | 349 |
| 211 | 1,1-Diphenylacetone | 210 | 60 | — | g 49.9% | 302 |
| 212 | 1,3-Diphenylacetone | 210 | 33 | 330 | g 49.8% | 302 |
| 213 | 4-Acetylbiphenyl | 196 | 117 | — | =s 8.6% | 302 |
| 214 | 2-Biphenylcarboxylic acid | 198 | 109 | 349 | g 50.2% | 349 |
| 215 | 4-Biphenylcarboxylic acid | 198 | 225 | — | =s 25.7%? | 349 |
| 216 | m-Terphenyl | 230 | 83 | 379 | g 50.2% | 302 |
| 217 | 4-Benzoylbiphenyl | 258 | 100 | 419 | g 50.2% | 349 |
| 217 | 4-Benzoylbiphenyl | 258 | 100 | 419 | s 49.2% | 302 |
| 218 | 4,4'-Diphenyl-benzophenone | 334 | — | — | g 50.0% | 302 |
| 219 | 1-Benzoyl-4-piperidone | 203 | 56 | 399 | g 10.2%? | 349 |

TABLE 1-continued

RELATIVE SOLUBILITY OF POLY(PHENYLENE
SULFIDE), (PPS), IN VARIOUS ORGANIC COMPOUNDS

| Ref. No. | Compound | Molec. Weight | Melting Point | Boiling Point | Approximate Solub. (g = $^>$; s = $^-$) | Temp. (°C.) |
|---|---|---|---|---|---|---|
| 220 | 2-Benzoylnaphthalene | 232 | 81 | 383 | g 50.5% | 349 |
| 221 | Diphenyl carbonate | 214 | 79 | 301 | g 24.9% | 302 |
| 221 | Diphenyl carbonate | 214 | 79 | 301 | g 50.0%?a | 302 |
| 222 | Bibenzyl | 182 | 51 | 284 | s 10.1% | 274 |
| 223 | Diphenyl methyl phosphate | 264 | — | 389 | s 10.2%a | 349 |
| 224 | 1-Bromonaphthalene | 207 | −1 | 280 | g 50.6% | 274 |
| 225 | N,N-Diphenylformamide | 197 | 71 | 337 | g 50.2% | 302 |
| 226 | 3-Phenoxybenzyl alcohol | 200 | — | 329 | g 50.0% | 302 |
| 227 | Fluoranthene | 202 | 108 | 384 | g 50.0% | 349 |
| 228 | 2-Phenoxybiphenyl | 246 | 49 | 342 | g 50.0% | 302 |
| 229 | Triphenyl phosphate | 326 | 51 | 281 | s 10.3% | 274 |
| 230 | Cyclohexyl phenyl ketone | 188 | 56 | — | =s 10.0% | 302 |
| 231 | 2,5-Diphenyl-1,3,4-oxadiazole | 222 | 139 | 382 | g 50.1% | 349 |
| 232 | 1,4-Dibenzoylbutane | 266 | 107 | — | g 49.8% | 302 |
| 247 | Phenyl benzoate | 198 | 69 | 298 | s 9.8% | 274 |
| 248 | 1-Phenyldecane | 218 | — | 293 | s 10.4% | 274 |
| 249 | 1-Methoxynaphthalene | 158 | — | 269 | g 48.9% | 247 |
| 250 | 2-Methoxynaphthalene | 158 | 74 | 274 | g 24.8% | 242 |
| 250 | 2-Methoxynaphthalene | 158 | 74 | 274 | s 50.0% | 247 |
| 251 | Sulfuric acid, concentrated | 98 | 11 | 340 | 0.0% | 25 |
| 252 | 4-Bromobiphenyl | 233 | 86 | 310 | g 50.0% | 258 |
| 252 | 4-Bromobiphenyl | 233 | 86 | 310 | g 11.3% | 234 |
| 252 | 4-Bromobiphenyl | 233 | 86 | 310 | g 26.9% | 240 |
| 253 | 4-Bromodiphenyl ether | 249 | 18 | 305 | g 24.7% | 243 |
| 253 | 4-Bromodiphenyl ether | 249 | 18 | 305 | g 50.1% | 274 |
| 254 | 1,3-Diphenoxybenzene | 262 | 60 | — | s 11.3% | 255 |
| 254 | 1,3-Diphenoxybenzene | 262 | 60 | — | =s 50.0% | 274 |
| 255 | 1,8-Dichloroanthraquinone | 277 | 202 | — | s 11.5% | 254 |
| 255 | 1,8-Dichloroanthraquinone | 277 | 202 | — | =s 9.7%a | 274 |
| 256 | 9,10-Dichloroanthracene | 247 | 214 | — | g 11.4% | 252 |
| 256 | 9,10-Dichloroanthracene | 247 | 214 | — | g 50.0% | 302 |
| 257 | 4,4'-Dibromobiphenyl | 312 | 170 | 355 | g 11.4% | 234 |
| 257 | 4,4'-Dibromobiphenyl | 312 | 170 | 355 | g 50.1% | 302 |
| 257 | 4,4'-Dibromobiphenyl | 312 | 170 | 355 | s 24.8% | 242 |
| 258 | Benzophenone | 182 | 50 | 305 | g 50.4% | 274 |
| 259 | Polyphosphoric acid | — | — | — | s 4.4%a | 302 |
| 260 | 1-Chloronaphthalene | 162 | −20 | 258 | s 10.0% | 203 |
| 260 | 1-Chloronaphthalene | 162 | −20 | 258 | g 24.3% | 236 |
| 260 | 1-Chloronaphthalene | 162 | −20 | 258 | s 49.8% | 237 |
| 261 | Diphenyl ether | 170 | 27 | 259 | =s 9.7% | 247 |
| 262 | 1-Cyclohexyl-2-pyrrolidinone | 167 | — | 302 | s 9.5% | 203 |
| 262 | 1-Cyclohexyl-2-pyrrolidinone | 167 | — | 302 | g 24.6% | 236 |
| 262 | 1-Cyclohexyl-2-pyrrolidinone | 167 | — | 302 | s 50.0% | 237 |
| 262 | 1-Cyclohexyl-2-pyrrolidinone | 167 | — | 302 | g 50.2% | 302 |
| 263 | 1-Benzyl-2-pyrrolidinone | 175 | — | — | s 10.2% | 233 |
| 263 | 1-Benzyl-2-pyrrolidinone | 175 | — | — | g 50.4% | 302 |
| 264 | o,o'-Biphenol | 186 | 109 | 315 | g 49.9% | 302 |
| 265 | HB-40 (hydrogenated terphenyl) (Monsanto Co.) | 244 | — | 325 | g 49.4% | 302 |
| 266 | Dioctyl phthalate | 391 | −50 | 384 | s 10.0% | 349 |
| 267 | 5-Chloro-2-benzoxazolone | 170 | 191 | — | s 10.2%a | 349 |
| 268 | Dibenzothiophene | 184 | 98 | 332 | g 50.3% | 302 |
| 269 | Bis(4-chlorophenyl sulfone) | 287 | 146 | 412 | s 9.9%a | 349 |
| 270 | Diphenyl phthalate | 318 | 75 | — | g 24.8% | 349 |
| 270 | Diphenyl phthalate | 318 | 75 | — | g 50.0%? | 349 |

TABLE 1-continued

RELATIVE SOLUBILITY OF POLY(PHENYLENE SULFIDE), (PPS), IN VARIOUS ORGANIC COMPOUNDS

| Ref. No. | Compound | Molec. Weight | Melting Point | Boiling Point | Approximate Solub. (g = >; s = <) | Temp. (°C.) |
|---|---|---|---|---|---|---|
| 271 | 2,6-Diphenylphenol | 246 | 101 | — | g 49.9% | 349 |
| 272 | Diphenyl sulfide | 186 | −40 | 296 | =s 49.4% | 274 |
| 273 | Diphenyl chlorophosphate | 269 | — | 360 | s 10.0%a | 349 |
| 274 | Fluorene | 166 | 113 | 298 | =s 50.1% | 274 |
| 275 | Phenanthrene | 178 | 100 | 340 | g 49.9% | 302 |
| 276 | Sulfolane | 120 | 27 | 285 | s 10.0% | 274 |
| 277 | Methyl myristate | 242 | 18 | 323 | s 7.4% | 302 |
| 278 | Methyl stearate | 299 | 38 | 358 | s 10.1% | 349 |
| 279 | Phenothiazine | 199 | 182 | 371 | g 50.1% | 349 |
| 280 | Hexadecane | 226 | 19 | 288 | s 10.0% | 274 |
| 281 | Dimethyl phthalate | 194 | 2 | 282 | s 9.6% | 274 |
| 282 | Tetraethylene glycol dimethyl ether | 222 | −30 | 275 | s 9.8% | 242 |
| 283 | Diethylene glycol dibutyl ether | 218 | −60 | 256 | s 9.8% | 242 |
| 284 | Docosane | 311 | 44 | 369 | s 5.2% | 349 |
| 286 | Dotriacontane | 451 | 70 | 476 | s 10.1% | 349 |
| 287 | 2,7-Dimethoxy-naphthalene | 188 | 138 | — | g 50.1% | 274 |
| 288 | 2,6-Dimethoxy-naphthalene | 188 | 153 | — | g 50.1% | 274 |
| 289 | o-Terphenyl | 230 | 58 | 337 | g 49.9% | 302 |
| 290 | 4,4'-Dimethoxy-benzophenone | 242 | 142 | — | g 50.0% | 349 |
| 291 | 9,10-Diphenyl-anthracene | 330 | 246 | — | g 50.0% | 349 |
| 292 | 1,1-Diphenylethylene | 180 | 6 | 270 | =s 25.1% | 243 |
| 292 | 1,1-Diphenylethylene | 180 | 6 | 270 | s 48.8% | 247 |
| 293 | epsilon-Caprolactam | 113 | 71 | 271 | g 25.1% | 242 |
| 293 | epsilon-Caprolactam | 113 | 71 | 271 | s 50.1% | 247 |
| 294 | Tetraphenylethylene | 332 | 223 | 420 | s 9.8% | 302 |
| 295 | Pentafluorophenol | 184 | 35 | 143 | s 4.6% | 141 |
| 296 | Thianthrene | 216 | 158 | 365 | g 50.0% | 302 |
| 297 | 1-Methyl-2-pyrrolidinone | 99 | −24 | 202 | s 10.0% | 203 |
| 298 | Pentachlorophenol | 266 | 189 | 310 | g 50.3%?a | 302 |
| 299 | Pyrene | 202 | 150 | 404 | g 50.0% | 273 |
| 300 | Benzanthrone | 230 | 169 | — | s 50.0%ab | 323 |
| 301 | 9,9'-Bifluorene | 330 | 247 | — | g 50.1% | 275 |
| 302 | Santowax R (Monsanto) | — | 145 | 364 | g 50.0% | 273 |
| 303 | Therminol 66 (Monsanto Co.) | 240 | — | 340 | g 50.0% | 273 |
| 304 | Therminol 75 (Monsanto Co.) | — | 70 | 385 | g 50.0% | 273 |
| 305 | 1-Phenyl-2-pyrrolidinone | 161 | 68 | 345 | g 50.0% | 273 |
| 306 | 4,4'-Isopropyli-denediphenol | 228 | 156 | 402 | s 50.0%ab | 323 |
| 306 | 4,4'-Isopropyli-denediphenol | 228 | 156 | 402 | g 24.9%b | 275 |
| 307 | 4,4'-Dihydroxybenzo-phenone | 214 | 214 | — | s 10.3% | 319 | a = Black or very dark color
b = reacts

Table 2 below ellustrates those organic compounds which dissolve at least 50 weight percent PPS. In Table 2, in the approximate solubility column, "g" represents "greater than" (<), "s" represents "less than" (>), and =represents "equal to".

TABLE 2

ORGANIC COMPOUNDS WHICH DISSOLVE AT LEAST 50 WEIGHT PERCENT OF PPS

| Ref. No. | Compound | Approximate Solub. (g = >; s = <) | Temperature °C. |
|---|---|---|---|
| 249 | 1-Methoxynaphthalene | g 48.9% | 247 |
| 265 | HB-40 (hydrogenated terphenyl) | g 49.4% | 302 |
| 246 | 1-Ethoxynaphthalene | g 49.8% | 274 |
| 212 | 1,3-Diphenylacetone | g 49.8% | 302 |
| 232 | 1,4-Dibenzoylbutane | g 49.8% | 302 |
| 275 | Phenanthrene | g 49.9% | 302 |
| 253 | 4-Bromodiphenyl ether | g 49.9% | 302 |
| 217 | 4-Benzoylbiphenyl | g 49.9% | 302 |
| 289 | o-Terphenyl | g 49.9% | 302 |
| 211 | 1,1-Diphenylacetone | g 49.9% | 302 |
| 264 | o,o'-Biphenol | g 49.9% | 302 |
| 271 | 2,6-Diphenylphenol | g 49.9% | 349 |
| 203 | 1,2,3-Triphenylbenzene | g 49.9% | 349 |
| 202 | Triphenylene | g 49.9% | 350 |
| 252 | 4-Bromobiphenyl | g 50.0% | 258 |
| 245 | 2-Phenylphenol | g 50.0% | 274 |
| 296 | Thianthrene | g 50.0% | 302 |
| 218 | 4,4'-Diphenyl benzophenone | g 50.0% | 302 |
| 226 | 3-Phenoxybenzyl alcohol | g 50.0% | 302 |
| 244 | 4-Phenylphenyl | g 50.0% | 302 |
| 256 | 9,10-Dichloroanthracene | g 50.0% | 302 |
| 238 | p-Terphenyl | g 50.0% | 302 |
| 228 | 2-Phenoxybiphenyl | g 50.0% | 302 |
| 201 | Triphenylmethane | g 50.0% | 349 |
| 290 | 4,4'-dimethoxybenzophenone | g 50.0% | 349 |
| 291 | 9,10-Diphenylanthracene | g 50.0% | 349 |
| 227 | Fluoroanthene | g 50.0% | 349 |
| 208 | Diphenyl sulfone | g 50.0% | 349 |
| 270 | Diphenyl phthalate | g 50.0% | 349 |
| 221 | Diphenyl carbonate | g 50.0%?a | 302 |
| 288 | 2,5-Dimethoxynaphthalene | g 50.0% | 274 |
| 287 | 2,7-Dimethoxynaphthalene | g 50.0% | 274 |
| 253 | 4-Bromodiphenyl ether | g 50.1% | 274 |
| 257 | 4,4-Dibromobiphenyl | g 50.1% | 302 |
| 243 | 1-Phenylnaphthalene | g 50.1% | 302 |
| 279 | Phenothiazine | g 50.1% | 349 |
| 231 | 2,5-Diphenyl-1,3,4-oxadiazole | g 50.1% | 349 |
| 209 | 2,5-Diphenyloxazole | g 50.1% | 349 |
| 200 | Triphenylmethanol | g 50.1%? | 349 |
| 262 | 1-Cyclohexyl-2-pyrrolidinone | g 50.2% | 302 |
| 225 | N,N-Diphenylformamide | g 50.2% | 302 |
| 216 | m-Terphenyl | g 50.2% | 302 |
| 237 | Benzil | g 50.2% | 302 |
| 239 | Anthracene | g 50.2% | 302 |
| 257 | 4,4'-Dibromobiphenyl | g 50.2% | 349 |
| 217 | 4-Benzoylbiphenyl | g 50.2% | 349 |
| 235 | Dibenzoylmethane | g 50.2% | 349 |
| 214 | 2-Biphenylcarboxylic acid | g 50.2% | 349 |
| 268 | Dibenzothiophene | g 50.3% | 302 |
| 298 | Pentachlorophenol | g 50.3%?a | 302 |
| 258 | Benzophenone | g 50.4% | 274 |
| 263 | 1-Benzyl-2-pyrrolidinone | g 50.4% | 302 |
| 233 | 9-Fluorenone | g 50.4% | 302 |
| 220 | 2-Benzoylnaphthalene | g 50.5% | 349 |
| 224 | 1-Bromonaphthalene | g 50.6% | 274 |
| 272 | Diphenyl sulfide | =s 49.4% | 274 |
| 254 | 1,3-Diphenoxybenzene | =s 50.0% | 274 |
| 274 | Fluorene | =s 50.1% | 274 |
| 205 | Tetraphenylmethane | =s 50.3%? | 349 |
| 299 | Pyrene | g 50.0% | 273 |
| 301 | 9,9'-Bifluorene | g 50.1% | 275 |
| 305 | 1-Phenyl-2-pyrrolidinone | g 50.0% | 273 |
| 302 | SANTOWAX ® brand organic compound (Monsanto Co.) (Chem. Abstracts #26140–60–3) | g 50.0% | 273 |
| 303 | THERMIONOL brand organic compound (Monsanto Co.) (Chem. Abstracts #61788–32–7) | g 50.0% | 273 |

TABLE 2-continued

ORGANIC COMPOUNDS WHICH DISSOLVE
AT LEAST 50 WEIGHT PERCENT OF PPS

| Ref. No. | Compound | Approximate Solub. (g = $^>$; s = $^<$) | Temperature °C. |
|---|---|---|---|
| 304 | THERMIONOL 75 (Monsanto Co.) (Chem. Abstracts #26140–60–3 and 217–59–4 mixture) | g 50.0% | 273 |

Poly(phenylene Sulfide)—The poly(phenylene sulfide) (CAS No. 26125-40-6) was purchased from Hoechst Celanese, Chatham, N.J., under the trade name FORTRON®. The grade was either 0300 BO (powder), or 0300 PO (pellet). The manufacturer's literature indicates a melting point of 285°–300° C. The melt flow was determined using a Tinius Olsen Extrusion Plastometer at 315° C., a weight of 2160 g, and an orifice of 0.0825 in. wide, and a length of 0.315 in. The melt flow rate was 16.1 g/10 min.

Amorphous Polymers

Polystyrene—The polystyrenes used were of two different grades.

Polystyrene SYTRON® Grade 685D is a general purpose polystyrene obtained from Dow Chemical U.S.A., Midland, Mich. This grade has a melt flow rate of 1.6 gram per 10 minutes as measured by ASTM D-1238 (Condition G), and a Vicat softening point of 108° C. as measured by ASTM-1525 (Rate B).

Polystryene STYRON® Grade 666D is a general purpose polystyrene obtained from Dow Chemical U.S.A., Midland, Mich. This grade has a melt flow rate of 8.0 gram per 10 min as measured by ASTM D-1238 (Condition G), and a Vicat softening point of 99° C. as measured by ASTM D-1525 (Rate B).

Polysulfone is commercially available as UDEL™, from Amoco Chemical co., Grade 1700 and has a melt index of 6.5 g/min at 660° F. and 44 psi. Grade 3500 has a melt index of 3.5 g/min at 660° F. and 44 psi. Grade 3703 does not have a published melt index.

Poly(etherimide) is commercially available as ULTEM™, Grade 1000 from the General Electric Co.

EXAMPLE 1

PPS/DPS/POLYSTYRENE FILM

A mixture of 50 wt % poly(phenylene sulfide) (PPS) (Celanese FORTRON® 300 Powder) and the solvent diphenyl sulfone (DPS) were compounded in a Welding Engineer twin screw extruder at approximately 290° C. The cooled polymer-solvent mixture was then ground to pellet size particles. The polymer-solvent mixture was mixed with the amorphous polymer polystyrene (Dow STYRON® 685D) to produce a final (composition of 40 wt % PPS/ 40wt % DPS/20 wt % STYRON. On the front of the extruder was a 2 in long, ½ in diameter element KOCH™ mixing section and a 2¼ in film die set at a gap thickness of approximately 25 mil. The film die temperature was approximately 250° C. The extruded film was taken up and cooled on a 7⅝" diameter roll running at 8 ft/min. The thickness of the film membrane after extrusion was 2 mil.

The film was soaked in methylene chloride for approximately 2 hrs. and dried. The properties of the porous film membrane produced were:

$N_2$ flux=$6 \times 10^{-1}$ cc/cm$^2$ sec cmHg $H_2O$ flux=$1.5 \times 10^5$ ml/m$^2$ hr cmHg The pore size of the membrane was evaluated by a modified version of ASTM F-316-86. The results were:

Mean pore size: 1.7 micron

Max. pore size: 4.6 micron

Examination of the membrane surface by scanning electron microscopy revealed that the surface of the membrane appeared to have pores of approximately 40 micron diameter.

Actual composition of the tertiary blend after the second extrusion was found to be 39.5/39.2/20.3 by Thermal Gravimetric Analysis (TGA).

BINARY FORMULATIONS

A number of microporous membranes were produced using no organic compound solvent. The reaction conditions were described below in Examples 1A to 1D. Some results are summarized on Table 3 below.

EXAMPLE 1A

BINARY PPS/PS AMORPHOUS MICROPOROUS MEMBRANE

Poly(phenylene sulfide) PPS and the amorphous polymer atactic polystyrene (PS) were used to prepare a porous film membrane. A mixture of 70 percent (by weight) of poly (phenylene sulfide) (Hoechst-Celanese, FORTON 300 PO) and 30 percent polystyrene (DOW Chemical, Styron 666) was prepared by combining pellets of the two polymers. The mixture of pellets was fed to a twin screw extruder, equipped with a static mixing element (KOCH™, 2 in long by 0.5 in diameter), at 300° C. and extruded into film form using a 2 in film die. The film was taken up on a godet roll. The film was subsequently leached in methylene chloride and air dried to give a porous film membrane possessing a nitrogen flux of 0.036 cm$^3$/cm$^2$ sec cmHg. The membrane has a water flux of $1.6 \times 10^4$ ml m$^2$ hr cmHg. Bubble point measurements (ASTM-F316-86) indicate a mean pore size of 2.4 microns and a maximum pore size of 9.2 microns. See Table 3, Example 1A.

EXAMPLES 1B, 1C AND 1D

BINARY PPS/AMORPHOUS POLYMER HOLLOW FIBER MEMBRANES

Hoechst Celanese FORTRON® PPS, described previously, was used in it's powder form. Extrudable polymer blends were prepared by combining the PPS with pellets of either polysulphone or polyetherimide, mixing, and then extruding the binary blends through a ¾ in single screw extruder at 370° C. The blend was then chipped and reextruded through the single screw extruder with a hollow fiber spinnerette attached to form hollow fibers or tubules. The extrusion was accomplished using nitrogen as a core gas and chilled godet rolls to draw and collect the fiber. Melt pump speeds were maintained in all experiments at 30 g/min/spinnerette-hole and a godet speed was maintained at 20 ft/min. Hollow fibers were then leached in methylene chloride and tested for their membrane performance. The permeability results are summarized in Table 3 and examples 1B, 1C and 1D. These fibers are useful for microfiltration.

TABLE 3

BINARY PPS/AMORPHOUS POLYMER MICROPOROUS MEMBRANES

| Exp | PPS WT % | Second Polymer | wt % | $N_2$ FLUX[e] | $H_2O$ FLUX[f] | Pore MAX. (microns) |
|---|---|---|---|---|---|---|
| 1A[a] | 70 | PS | 30 | $3.6 \times 10^{-2}$ | 16,000 | 9.2 |
| 1B[b] | 60 | PEI | 40 | $8 \times 10^{-5}$ | 5 | <0.065 |
| 1C[c] | 70 | PEI | 30 | $1.7 \times 10^{-6}$ | <1 | <0.065 |
| 1D[d] | 60 | PSF (3304) | 40 | $0.8 \times 10^{-2}$ | 2,054 | 0.44 |

[a]PS = polystyrene, mean pore size 2.4, thin sheet form.
[b]PEI = polyetherimide, mean pore size not measured, hollow fiber form.
[c]PEI = polyetherimide, mean pore size not measured, hollow fiber form.
[d]PSF = polysulfone, mean pore size not measured, hollow fiber form.
[e]cc/cm² sec cmHg.
[f]ml/m² hr cmHg.

EXAMPLE 2

PPS/DPS/POLYSTYRENE FILM

The polymer-solvent mixture was formulated in the same manner as described above in Example 1 and then mixed with the amorphous polymer polystyrene (Dow STYRON® 685D) to give a final composition of 42.5 wt % PPS/42.5 wt % DPS/15 wt % STYRON™. The extrusion conditions for this process were the same as the one in Example 1.

The properties of the porous film membrane produced were:

$N_2$ flux=$1 \times 10^{-4}$ cc/cm² sec cmHg $H_2O$ flux=unmeasurable

The pore size of the membrane could not be evaluated by present apparatus.

The actual composition of the tertiary blend PPS/DPS/STYRON after the second extrusion was determined to be 45.7/41.7/12.6 by TGA.

EXAMPLE 3

PPS/TERP/PS FILM

A tertiary blend of 33 wt % poly(phenylene sulfide) (PPS) FORTRON™ 300 powder), 37 wt % hydrogenated terphenyl (Monsanto) (HB 40™), and 30 wt % polysulfone (PSF) Amoco UDEL™ 1700, high molecular weight, pellets) was prepared with a resin kettle blending setup at 260° C. The cooled blend was ground to pellet size particles. This tertiary blend in pellet form was extruded with a Welding Engineer twin screw extruder at approximately 290° C. On the front of the extruder was a 2 in long by ½ in diameter element KOCH™ mixing section, and a 2¼ in film die set by a gap thickness of approximately 25 mil. The film die temperature was approximately 270° C. The extruded film was taken up and cooled on a 7⅝ in diameter roll running at 4.5 ft/min.

The film was soaked in methylene chloride for overnight and then vacuum dried. The properties of the porous film membranes produced were:

$N_2$ flux=$3.66 \times 10^{-1}$ cc/sec cm² cmHg $H_2O$ flux=$5.49 \times 10^4$ cc/hr m² cmHg The pore size of the membrane was evaluated by a modified version of ASTM F-316-86. The results were as follows:

Mean pore size: 0.49 micron

Max. pore size: 3.08 micron

The thickness of the membrane was 1.316 mm.

EXAMPLE 4

PPS/TERP/PS FILM

A tertiary blend of 33 wt % poly(phenylene sulfide) (PPS) (Celanese FORTRON™ 300 powder), 37 wt % hydrogenated terphenyl (Monsanto) (HB 40™), and 30 wt % polysulfone (PSF) (Amoco UDEL™ 3500, extrusion grade pellets) was prepared with a resin kettle blending setup at around 260° C. The cooled blend was ground to pellet size particles. This tertiary blend in pellet form was extruded with a Welding Engineer twin screw extruder at approximately 290° C. on the front of the extruder was a 2 in long, ½ in diameter element KOCH™ mixing section, and a 2¼ in film die set by a gap thickness of approximately 25 mil. The film die temperature was approximately 270° C. The extruded film was taken up and cooled on a 7⅝ in diameter roll running at 3.6 ft/min.

The film was soaked in methylene chloride overnight and vacuum dried. The properties of the porous film membranes formed were:

$N_2$ flux=$1.45 \times 10^{-2}$ cc/sec cm² cmHg $H_2O$ flux=$5.03 \times 10^2$ cc/hr m² cmHg The pore size of the membrane was evaluated by a modified version of ASTM F-316-86. The results were:

Mean pore size: 0.15 micron;

Max. pore size: 0.77 micron.

The thickness of the membrane was 1.321 mm.

EXAMPLE 5

PPS/TERP/PSF FILM (a) A tertiary blend of 33 wt % poly(phenylene sulfide) (PPS) (Celanese FORTRON™ 300 powder), 37 wt % hydrogenated terphenyl (Monsanto) (HB 40™), and 30 wt % polysulfone (PSF) (Amoco UDEL™ 3703, low molecular weight, pellets) was prepared with a resin kettle blending setup at around 260° C. The cooled blend was ground to pellet size particles. This tertiary blend in pellet form was extruded with a Welding Engineer twin screw extruder at approximately 290° C. On the front of the extruder was a 2 in. long, ½ in diameter element KOCH™ mixing section, and a 2¼ in film die set by a gap thickness of approximately 25 mil. The film die temperature was approximately 270° C. The extruded film was taken up and cooled on a 7⅝ in diameter roll running at 3 ft/min.

The film was soaked in methylene chloride for overnight and then vacuum dried. The properties of the porous film membranes formed were:

N2 flux=$5.8 \times 10^{-1}$ cc/sec cm² cmHg $H_2O$ flux=$1.20 \times 10^5$ cc/hr m² cmHg The pore size of the membrane was evaluated by a modified version of ASTM F-316-86. The results were:

Mean pore size: 0.67 micron;

Max. pore size: 3.08 micron.

The thickness of the membrane is 1.496 mm.

EXAMPLE 6

PPS/TERP/PSF FILM (a) A tertiary blend of 33 wt % poly(phenylene sulfide) (PPS) (Celanese FORTRON™ 300 powder), 47 wt % hydrogenated terphenyl (Monsanto) (HB40™, and 20 wt % polysulfone (PSF) (Amoco UDEL™ 1700, high molecular weight, pellets) was prepared with a resin kettle blending setup at about 260° C. The cooled blend was ground to pellet size particles. This tertiary blend in pellet form was extruded with a Welding Engineer twin screw extruder at approximately 290° C. On the front of the extruder was a 2 in. long, ½ in. diameter element KOCH™ mixing section, and a 2¼ in. film die set by a gap thickness of approximately 25 mil. The film die temperature was approximately 270° C. The extruded film was taken up and cooled on a 7⅝ in. diameter roll running at 10 ft/min.

The film was soaked in methylene chloride overnight and then vacuum dried. The properties of the porous film membranes formed when the roller was running at 10 ft/min. were:

$N_2$ flux=$3.67 \times 10^{-3}$ cc/sec $cm^2$ cmHg
$H_2O$ flux=$3.35 \times 10^2$ cc/hr $m^2$ cmHg The pore size of the membrane was evaluated by a modified version of ASTM F-316-86. The results were:

Mean pore size: <0.1 micron
Max. pore size: 0.26 micron

The membrane had a thickness of 0.582 mm. (b) Example 6 (a) was repeated except that the roller speed was 16 ft/min. The membrane had the following properties:

$N_2$ flux=$4.62 \times 10^{-3}$ cc/$cm^2$ sec cmHg
$H_2O$ flux=$4.92 \times 10^2$ cc/hr $m^2$ cmHg The pore size of the membrane was evaluated by a modified version of ASTM F-316-86. The results were:

Mean pore size: <0.1 micron
Max. pore size: 0.23 micron

The membrane had a thickness of 0.405 mm. (c) Example 6(a) was repeated except that the roller speed was 20 ft/min.

The membrane had the following properties:

$N_2$ flux=$5.94 \times 10^{-3}$ cc/sec $cm^2$ cmHg
$H_2O$ flux=$6.37 \times 10^2$ cc/hr $m^2$ cmHg.

The pore size of the membrane was evaluated by a modified version of ASTM F-316-8. The results were:

Mean pore size: <0.1 micron
Max. pore size: 0.27 micron

The thickness of the membrane was 0.396 mm.

EXAMPLE 7

PPS/DPIP-DPTP/PSF FIBER

40% PPS, 40% diphenyl isophthalate/diphenyl terephthalate (75/25 w/w), 20% polysulphone. The spin rate 80 ft/min, quench room temperature water 10 in. from spinnerette face, ID=550 micrometers, initial weight of sample= 1.48 g; weight post methylene chloride leach=0.61 g=41% PPS.

$N_2$ flux=0.24 cc/$cm^2$ sec cmHg
$H_2O$ flux=90,000 cc/$m^2$ hr cmHg
bubble point=8 psi
Max. pore size=1.1 micrometer.

EXAMPLE 8

PPS/CLTM/PS FIBER

40% PPS, 40% caprolactam, 20% polysulphone. The spin rate 120 ft/min., quench room temperature water 15 inches from spinnerette face initial weight of sample–2.36 g, final weight–1.05 g=44% PPS fiber.

$N_2$ flux=0.10 cc/$cm^2$ sec cmHg
$H_2O$ flux=42,500 cc/$m^2$ hr cmHg
bubble point=12 psi
Max. pore size=0.75 micrometer.

EXAMPLE 9

PPS/CLTM/PS FIBER

35% PPS, 45% epsilon caprolactam, 20% polysulphone. The spin rate 140 ft/min, quench room temperature water 15 in from spinnerette face. Initial weight of sample=1.60 grams; final weight=$0.69_g$=43% PPS.

$N_2$ flux=0.012 cc/$cm^2$ sec cmHg
Bubble point=19 psi
Max pore size=0.5 micrometers.

EXAMPLE 10

PPS/HB-40/PS FIBER

40% PPS, 40% Monsanto® HB-40 heat transfer fluid, 20% polysulphone. The spin rate 90 ft/min, room temperature water quench 20 in from face. The initial sample weight=4.26 g, final weight=1.84 g=43% PPS, fiber 500 micrometer ID.

$N_2$ flux=0.0010 cc/$cm^2$ sec cmHg
Bubble point=>100 psi
Max pore size=<0.09 micrometers.

EXAMPLE 11

PPS/PS HB-40/IRGANOX HOLLOW FIBER MEMBRANE

33% PPS, 30% polysulphone, 37% HB-40, 0.2% Irganox$^R$ (antioxidant), spin rate=150 ft/min, water quench 15 in from spinnerette face 300 micrometer ID. 35%. PPS following methylene chloride leach=

$N_2$ flux=$3.5 \times 10^{-2}$ cc/$cm^2$ sec cmHg
$H^2O$ flux=15,000 cc/$m^2$ hr cmHg
Bubble point=18 psi
Max. pore size=0.5 micrometer.

EXAMPLE 12

PPS/HB 40/PEI HOLLOW FIBER MEMBRANE

40% PPS, 40% HB-40, 20% poly(ethermide)(PEI) was spun at a spin rate 140 ft/min. No quench bath. Draw zone 15 in, ID-350 micron. Initial weight=5.61 g, final weight= 2.47 g, 44% PPS methylene chloride leach.

$N_2$ flux=0.007 cc/$cm^2$ sec cmHg
$H_2O$ flux=Not available
Bubble point=75 psi
Max pore size=0.1 2 micron

EXAMPLE 13

PPSIHB 40/PEI HOLLOW FIBER MEMBRANE

33% PPS, 42% HB-40, 25% PEI. The spin=rate 160 ft/min. No quench bath. Draw zone=15 in, 200 micron ID, methylene chloride leach bath, 36% PPS.

$N_2$ flux=0.021 cc/cm² sec cmHg $H_2O$ flux=3000 cc/M² hr cmHg

Bubble point=77 psi

Max. pore size=0.12 micron

EXAMPLE 14

PPS/HB 40/PEI HOLLOW FIBER MEMBRANE

28% PPS, 25% PEI, 47% HB-40; 60 ft/min draw zone=24 in, ID=500 micrometers. No quench bath, 31% PPS after methylene chloride leach.

$N_2$ flux=0.034 cc/cm² sec cmHg $H_2O$ flux=3,000 cc/m² hr cmHg

Bubble point=18 psi

Max. pore size=0.5 micron

While only a few embodiments of the invention have been shown and described herein, it will become apparent to those skilled in the art that various modifications and changes can be made in the fabrication of microporous poly (phenylene sulfide) polymers for use as membranes in the separation of components of a fluid mixture without departing from the spirit and scope of the present invention. All such modifications and changes coming within the scope of the appended claims are intended to be carried out thereby.

We claim:

1. A process for preparing a microporous membrane from a poly(phenylene sulfide) polymer comprising the steps of:
    A. forming a mixture comprising:
        (i) at least one poly(phenylene sulfide) polymer,
        (ii) at least one amorphous polymer which is substantially stable at elevated temperatures, which possesses a glass transition temperature of at least about −100° C., and wherein said amorphous polymer is at least partially immiscible in said poly(phenylene sulfide) polymer at ambient conditions; and
        (iii) optionally a plasticizer comprising at least one organic compound capable of dissolving at least about 10 weight percent of said poly(phenylene sulfide) polymer at the extrusion or casting temperature;
    B. heating the mixture to a temperature at which said mixture becomes a fluid;
    C. extruding or casting said fluid under conditions such that a membrane is formed;
    D. subjecting said membrane to controlled cooling or coagulation by passing said membrane through at least one zone under conditions such that said membrane solidifies;
    E. leaching said membrane by passing said membrane through at least one zone under conditions such that at least a portion of said optional plasticizer for said poly(phenylene sulfide) polymer, at least a portion of said amorphous polymer, or a combination thereof, is removed from said membrane; and
    F. producing a final microporous membrane.

2. The process of claim 1 which comprises the additional step of:
    G. before leaching, during leaching, after leaching, or a combination thereof, drawing said membrane to increase the flux of fluid through said membrane, while said membrane is at a temperature above about 25° C. and below the melting point of said poly(phenylene sulfide) polymer, or poly(phenylene sulfide) and amorphous polymer mixture, or poly(phenylene sulfide), amorphous polymer, and plasticizer mixture before and during leaching and for poly(phenylene sulfide) after leaching.

3. The process of claim 2 wherein said amorphous polymer is selected from the group consisting of polysulfones; polyarylsulfones; polyethersulfones; styrene copolymers; polyetherimides, polyetherimide copolymers; ethylene copolymers; amorphous polyesters; amorphous cellulose esters; polycarbonates; polystyrenes; polysiloxanes; polyacrylates; polymethacrylates; poly(vinylacetates); polybenzimidazoles; and polyacrylamides.

4. The process of claim 3 wherein said plasticizer is present and comprises at least one solvent consisting predominantly of carbon and hydrogen and optionally oxygen, nitrogen, sulfur, halogen, and mixtures thereof, wherein said solvent has a molecular weight of between about 160 and about 650, contains at least one 5, 6 or 7-membered ring structure, and possesses a boiling point of between about 150° C. and about 480° C.

5. The process of claim 4 wherein said plasticizer comprises at least one solvent selected from the group consisting of 4,4'-dibromobiphenyl; 1-phenylnaphthalene; phenothiazine; 2,5-biphenyl-1,3,4-oxadiazole; 2,5-diphenyloxazole; triphenylmethanol; N,N-diphenylformamide; m-terphenyl; benzil; anthracene; 4-benzoylbiphenyl; dibenzoylmethane; 2-biphenylcarboxylic acid; dibenzothiophene; pentachlorophenol; benzophenone; 1-benzyl-2-pyrrolidinone; 9-fluorenone; 2-benzoylnaphthalene; 1-bromomaphthalene; diphenyl sulfide; 1,3 diphenoxybenzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3,-triphenylbenzene; triphenylene; 4-bromobiphenyl; 2-phenylphenol; thianthrene; 4,4'-diphenylbenzophenone; 3-phenoxybenzyl alcohol; 4-phenylphenol; 9,10-dichloroanthracene; p-terphenyl; 2-phenoxybiphenyl; triphenylmethane; 4,4'-dimethoxybenzophenone; 9,10-diphenylanthracene; fluoranthene; diphenyl sulfone; diphenyl phthalate, diphenyl terephthalate; diphenyl isophthalate; diphenyl carbonate; 2,6-dimethoxynaphthalene; 2,7-dimethoxynaphthalene; 4-bromodiphenyl ether; pyrene; 9,9'-bifluorene; 4,4'-isopropylidenediphenol; 2,4,6-trichlorophenol; epsilon-caprolactam; 1-cyclohexyl-2-pyrrolidinone; and mixtures of these compounds.

6. The process of claim 5 wherein said plasticizer further comprises at least one non-solvent consisting predominantly of carbon and hydrogen and optionally oxygen, phosphorus, silicon, nitrogen, sulfur, halogen, and mixtures thereof, wherein said non-solvent has a molecular weight of between about 120 and about 650 and possesses a boiling point of between about 150° C. and about 480° C.

7. The process of claim 6 wherein said plasticizer comprises at least one non-solvent selected from the group consisting of 1,3,5-triphenylbenzene, tetraphenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphosphoric acid, dioctyl phthalate, 5-chlorobenzoxazolone, bis-(4-chlorophenol sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, and 4,4'-dihydroxybenzophenone.

8. The process of claim 7 wherein the amount of poly (phenylene sulfide) polymer in the polymer-plasticizer mixture is between about 10 weight percent and about 90 weight percent.

9. The process of claim 8 wherein the membrane is drawn in Step G at a temperature of between about 25° C. and about 273° C.

10. The process of claim 9 wherein said membrane is drawn to a draw ratio of between about 1.1 and about 40.

11. The process of claim 9 wherein said fluid is extruded at a temperature of between about 100° C. and about 400° C.

12. The process of claim 11 wherein said membrane is subjected to controlled cooling or coagulation at a temperature of between about 0° C. and about 275° C.

13. The process of claim 12 wherein the controlled cooling or coagulation is conducted in a gaseous environment.

14. The process of claim 13 wherein said membrane is leached at a temperature of between about 0° C. and about 275° C.

15. The process of claim 14 wherein the membrane is leached in a zone containing a liquid selected from the group consisting of toluene, xylene, acetone, methyl ethyl ketone, N-methylpyrrolidinone, water, an acid or alkali aqueous solution, and chlorinated hydrocarbons.

16. The process of claim 8 wherein said final membrane is useful for ultrafiltration, microfiltration, or macrofiltration, or as a composite membrane support.

17. The process of claim 16 wherein said final membrane possesses a porosity in the range of about 10 percent to about 90 percent.

18. The process of claim 17 wherein the mean pore size of said membrane is in the range of about 5 Angstroms to about 1,000 Angstroms for ultrafiltration, about 0.02 micron to about 10 microns for micro-filtration, and about 10 microns to about 50 microns for macrofiltration.

19. The process of claim 18 wherein said membrane possesses a nitrogen flux of at least about.

$$10^{-4} \frac{cm^3 \, (STP)}{cm^2 \, sec \, cmHg}.$$

20. The process of claim 18 wherein said membrane possesses a water flux of at least about.

$$10 \frac{ml}{m^2 \, hr \, cmHg}.$$

21. The process of claim 2 which further comprises the additional step of:

H. before leaching, after leaching, before drawing, after drawing, or a combination thereof, annealing said membrane by exposing said membrane to a temperature above the glass transition temperature of the poly (phenylene sulfide) polymer or the poly(phenylene sulfide) polymer and plasticizer mixture and about 10° C. below the melting point of the poly(phenylene sulfide) polymer or depressed melting point of the poly(phenylene sulfide) polymer and plasticizer mixture for a period of time between about 30 seconds and about 24 hours.

22. The process of claim 1 wherein said amorphous polymer is selected from the group consisting of polysulfones; polyarylsulfones; polyethersulfones; styrene copolymers; polyetherimides, polyetherimide co-polymers; ethylene copolymers; amorphous polyesters; amorphous cellulose esters; polycarbonates; polystyrenes; polysiloxanes; polyacrylates; polymethacrylates; poly(vinylacetates); polybenzimidazoles; and polyacrylamides.

23. The process of claim 22 wherein said plasticizer is present and comprises at least one solvent consisting predominantly of carbon and hydrogen and optionally oxygen, nitrogen, sulfur, halogen, and mixtures thereof, wherein said solvent has a molecular weight of between about 160 and about 650, contains at least one 5,6 or 7-membered ring structure, and possesses a boiling point of between about 150° C. and about 480° C.

24. The process of claim 23 wherein said plasticizer comprises at least one solvent selected from the group consisting of 4,4'-dibromobiphenyl; 1-phenylnaphthalene; phenothiazine; 2,5-piphenyl-1,3,4-oxadiazole; 2,5-diphenyloxazole; triphenylmethanol; N,N-diphenylformamide; m-terphenyl; benzil; anthracene; 4-benzoylbiphenyl; dibenzoylmethane; 2-biphenylcarboxylic acid; dibenzothiophene; pentachlorophenol; benzophenone; 1-benzyl-2-pyrrolidinone; 9-fluorenone; 2-benzoylnaphthalene; 1-bromomaphthalene; diphenyl sulfide; 1,3-diphenoxybenzene; fluorene; tetraphenylmethane; p-quaterphenyl; 1-phenyl-2-pyrrolidinone; 1-methoxynaphthalene; hydrogenated and partially hydrogenated terphenyl; 1-ethoxynaphthalene; 1,3-diphenylacetone; 1,4-dibenzoylbutane; phenanthrene; 4-benzoylbiphenyl; o-terphenyl; 1,1-diphenylacetone; o,o'-biphenol; 2,6-diphenylphenol; 1,2,3,-triphenylbenzene; triphenylene; 4-bromobiphenyl; 2-phenylphenol; thianthrene; 4,4' diphenylbenzophenone; 3-phenoxybenzyl alcohol; 4-phenylphenol; 9,10-dichloroanthracene; p-terphenyl; 2-phenoxybiphenyl; -triphenylmethane; 4,4'-dimethoxybenzophenone; 9,10-diphenylanthracene; fluoranthene; diphenyl sulfone; diphenyl phthalate; diphenyl terephthalate; diphenyl isophthalate; diphenyl carbonate; 2,6-dimethoxynaphthalene; 2,7-dimethoxynaphthalene; 4-bromodiphenyl ether; pyrene; 9,9'-bifluorene; 4,4'-isopropylidenediphenol; 2,4,6-trichlorophenol; epsilon-caprolactam; 1-cyclohexyl-2-pyrrolidinone; and mixtures of these compounds.

25. The process of claim 24 wherein said plasticizer further comprises at least one non-solvent consisting predominantly of carbon and hydrogen and optionally oxygen, phosphorus, silicon, nitrogen, sulfur, halogen, and mixtures thereof, wherein said non-solvent has a molecular weight of between about 120 and about 650 and possesses a boiling point of between about 150° C. and about 480° C.

26. The process of claim 25 wherein said plasticizer comprises at least one non-solvent selected from the group consisting of 1,3,5-triphenylbenzene, tetraphenylsilane, diphenyl sulfoxide, diphenic acid, 4-acetylbiphenyl, bibenzyl, diphenyl methyl phosphate, triphenyl phosphate, cyclohexyl phenyl ketone, mineral oil, butyl stearate, phenyl benzoate, 1-phenyldecane, 1,3-diphenoxybenzene, 1,8-dichloroanthraquinone, polyphosphoric acid, dioctyl phthalate, 5-chlorobenzoxazolone, bis-(4-chlorophenol sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, and 4,4'-dihydroxybenzophenone.

27. The process of claim 26 wherein the amount of poly(phenylene sulfide) polymer in the polymer-plasticizer mixture is between about 10 weight percent and about 90 weight percent.

28. The process of claim 27 wherein said fluid is extruded at a temperature of between about 100° C. and about 400° C.

29. The process of claim 28 wherein said membrane is subjected to controlled cooling or coagulation at a temperature of between about 0° C. and about 275° C.

30. The process of claim 29 wherein the controlled cooling or coagulation is conducted in a gaseous environment.

31. The process of claim 30 wherein said membrane is leached at a temperature of between about 0° C. and about 275° C.

32. The process of claim 31 wherein the membrane is leached in a zone containing a liquid selected from the group consisting of toluene, xylene, acetone, methyl ethyl ketone, N-methylpyrrolidinone, water, an acid or alkali aqueous solution, and chlorinated hydrocarbons.

33. The process of claim 27 wherein said final membrane is useful for ultrafiltration, microfiltration, or macrofiltration, or composite membrane support.

34. The process of claim 33 wherein said final membrane possesses a porosity in the range of about 10 percent to about 90 percent.

35. The process of claim 34 wherein the mean pore size of said membrane is in the range of about 5 Angstroms to about 1,000 Angstroms for ultrafiltration, about 0.02 micron to about 10 microns for micro-filtration, and about 10 microns to about 50 microns for macrofiltration.

36. The process of claim 35 wherein said membrane possesses a nitrogen flux of at least about $$10^{-4} \frac{cm^3 \,(STP)}{cm^2 \,sec \,cmHg}.$$

37. The process of claim 35 wherein said membrane possesses a water flux of at least about $$10 \frac{ml}{m^2 \,hr \,cmHg}.$$

38. The process of claim 22 which further comprises the additional step of:

I. before leaching, after leaching, or a combination thereof, annealing said membrane by exposing said membrane to a temperature above the glass transition temperature of the poly(phenylene sulfide) polymer, or the poly(phenylene sulfide) polymer and plasticizer mixture and about 10° C. below the melting point of the poly(phenylene sulfide) polymer or the depressed melting point of the poly(phenylene sulfide) polymer and plasticizer mixture for a period of time between about 30 seconds and about 24 hours.

* * * * *